US011511991B2

(12) United States Patent
Speth et al.

(10) Patent No.: US 11,511,991 B2
(45) Date of Patent: Nov. 29, 2022

(54) AUTOTHERMAL AMMONIA CRACKING PROCESS

(71) Applicant: Haldor Topsøe A/S, Kgs. Lyngby (DK)

(72) Inventors: Christian Henrik Speth, Lynge (DK); Tommy Lykke Wind, Allerød (DK); Per Juul Dahl, Vedbæk (DK)

(73) Assignee: Topsoe A/S, Kgs. Lyngby (DK)

( * ) Notice: Subject to any disclaimer, the term of this patent is extended or adjusted under 35 U.S.C. 154(b) by 377 days.

(21) Appl. No.: 16/624,387

(22) PCT Filed: Aug. 21, 2018

(86) PCT No.: PCT/EP2018/072488
§ 371 (c)(1),
(2) Date: Dec. 19, 2019

(87) PCT Pub. No.: WO2019/038251
PCT Pub. Date: Feb. 28, 2019

(65) Prior Publication Data
US 2020/0123006 A1    Apr. 23, 2020

(30) Foreign Application Priority Data

Aug. 24, 2017  (DK) .......................... PA 2017 00462
Oct. 2, 2017   (DK) .......................... PA 2017 00551

(51) Int. Cl.
*C01B 3/04*    (2006.01)
*B01J 8/02*    (2006.01)
(Continued)

(52) U.S. Cl.
CPC ............. *C01B 3/047* (2013.01); *B01J 8/0221* (2013.01); *B01J 12/005* (2013.01); *B01J 23/755* (2013.01);
(Continued)

(58) Field of Classification Search
CPC ........ C01B 3/047; C01B 21/26; B01J 8/0221; B01J 12/005; B01J 23/755;
(Continued)

(56) References Cited

U.S. PATENT DOCUMENTS

2001/0018035 A1    8/2001  Graville
2005/0037244 A1*   2/2005  Goetsch .................. C01B 3/047
                                                          429/441

(Continued)

FOREIGN PATENT DOCUMENTS

DE    26 17 089 A1     11/1977
DE    2617089  A   *   11/1977  ............. C01B 3/047
(Continued)

*Primary Examiner* — Steven J Bos
*Assistant Examiner* — Syed T Iqbal
(74) *Attorney, Agent, or Firm* — Blank Rome LLP

(57) ABSTRACT

Process for the production of a product gas containing nitrogen and hydrogen from ammonia comprising the steps of non-catalytic partial oxidation of ammonia with an oxygen containing gas to a process gas containing nitrogen, water, amounts of nitrogen oxides and residual amounts of ammonia; cracking of at least a part of the residual amounts of ammonia to hydrogen and nitrogen in the process gas by contact with a nickel containing catalyst and simultaneously reducing the amounts of nitrogen oxides to nitrogen and water by reaction with a part of the hydrogen formed during cracking of the process gas by contact of the process gas with the nickel containing catalyst; and withdrawing the hydrogen and nitrogen containing product gas.

18 Claims, 2 Drawing Sheets

Figure 1:
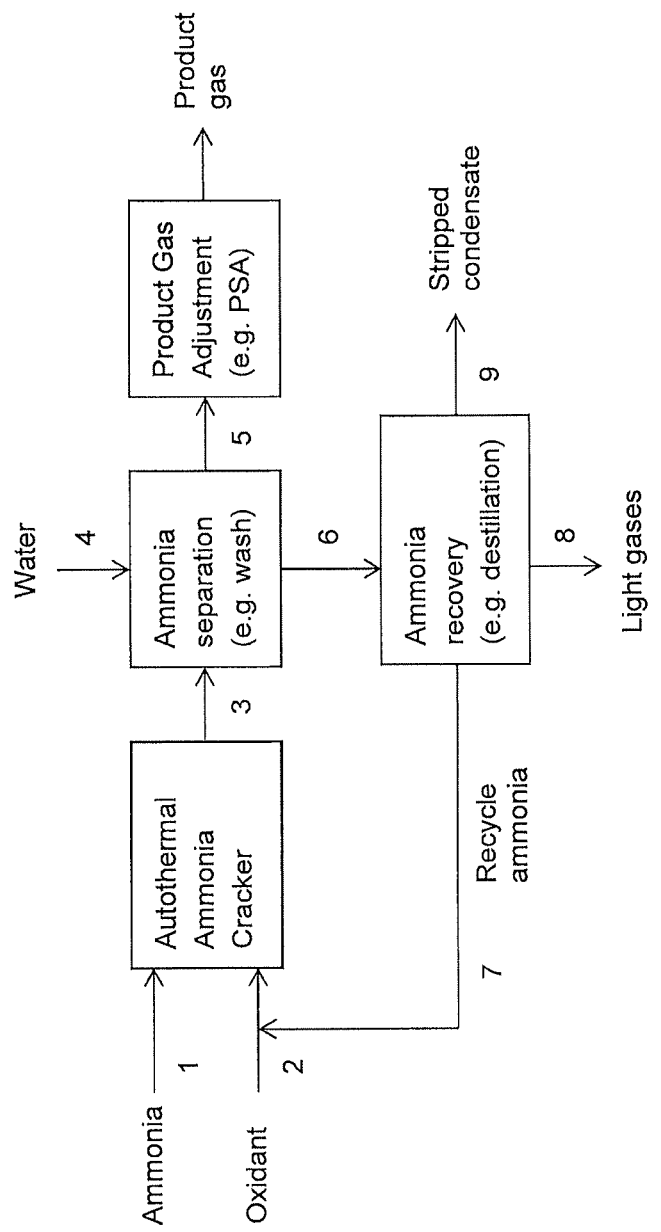

(51) Int. Cl.
  *B01J 12/00*    (2006.01)
  *B01J 23/755*   (2006.01)
  *C01B 21/26*    (2006.01)

(52) U.S. Cl.
  CPC ..... *C01B 21/26* (2013.01); *B01J 2208/00628* (2013.01); *B01J 2219/0059* (2013.01); *B01J 2219/00594* (2013.01)

(58) Field of Classification Search
  CPC ...... B01J 2208/00628; B01J 2219/0059; B01J 2219/00594; Y02E 60/36
  See application file for complete search history.

(56) References Cited

U.S. PATENT DOCUMENTS

| | | | |
|---|---|---|---|
| 2012/0148925 A1* | 6/2012 | Grannell | F23D 14/62 |
| | | | 429/408 |
| 2013/0266506 A1 | 10/2013 | Hikazudani et al. | |
| 2014/0105816 A1 | 4/2014 | Grannell et al. | |
| 2019/0084831 A1* | 3/2019 | Andersen | B01J 23/755 |

FOREIGN PATENT DOCUMENTS

| | | | | |
|---|---|---|---|---|
| EP | 2 554 257 A1 | 2/2013 | | |
| JP | 2014-208352 A | 11/2014 | | |
| WO | WO 02/071451 A2 | 9/2002 | | |
| WO | WO 2010/116874 A2 | 10/2010 | | |
| WO | WO-2016193751 A1 * | 12/2016 | | C01B 3/047 |

* cited by examiner

AUTOTHERMAL AMMONIA CRACKING PROCESS

The present invention relates to the production of a nitrogen and hydrogen containing gas. More particularly, the present invention provides a method for the production of such a gas by a sequence of non-catalytically partial oxidation of gaseous ammonia with an oxygen containing gas and cracking of residual amounts of ammonia contained in the partial oxidized process gas to a nitrogen and hydrogen product gas.

Liquid ammonia is an important source for the production of hydrogen or an important energy carrier, in particular for the generation of electrical power in regions with few or no fuel sources. As energy carrier, liquid ammonia may also act as a source to even out the fluctuating electricity production by renewable energy technologies such as wind, solar and hydro power. The advantage of ammonia as energy carrier is that liquid ammonia is easier to transport and to store, than for instance natural gas or hydrogen gas.

In order to be suitable as fuel for power production, ammonia needs to be cracked to a gas mixture consisting of hydrogen and nitrogen.

In the ammonia cracking process gaseous ammonia is dissociated into a mixture of hydrogen and nitrogen in the reversible reaction:

$$2NH_3 \leftrightarrows N_2 + 3H_2$$

The reaction is endothermic, requiring heat for maintaining the ammonia cracking reaction.

It has been found that heat produced in exothermic non-catalytic partial oxidation of ammonia by the following reaction $$2NH_3 + 3/2O_2 \rightarrow N_2 + 3H_2O$$

is sufficient to provide the necessary heat when subsequently performing the endothermic catalytic cracking of ammonia.

It has also been observed that nitrogen oxides being formed in the partial oxidized gas are reduced to nitrogen and water, when performing the cracking of ammonia by contact with a nickel containing catalyst. The nitrogen oxides are reduced by the hydrogen formed during the ammonia cracking reaction to harmless nitrogen and water and no further steps for the removal of nitrogen oxides of the cracked gas are necessary.

A further advantage is that the process according to the invention allows $CO_2$ free production of hydrogen product gas in the sense that the process does not generate any $CO_2$. If air is used as oxidant, small amounts of $CO_2$ will be added to the process with the air but the same amount of $CO_2$ is released again since no additional $CO_2$ is formed by the process reactions.

Pursuant to the above observations, the invention provides a process for the production of a product gas containing nitrogen and hydrogen from ammonia comprising the steps of non-catalytic partial oxidation of ammonia with an oxygen containing gas to a process gas containing nitrogen, water, amounts of nitrogen oxides and residual amounts of ammonia;

cracking of at least a part of the residual amounts of ammonia to hydrogen and nitrogen in the process gas by contact with a nickel containing catalyst and simultaneously reducing the amounts of nitrogen oxides to nitrogen and water by reaction with a part of the hydrogen formed during cracking of the process gas by contact of the process gas with the nickel containing catalyst; and withdrawing the hydrogen and nitrogen containing product gas.

By the process of the invention, the amount of nitrogen oxides generated in the noncatalytic partial oxidation step is reduced by more than 80%, practically up to 100% as limited by thermodynamic equilibrium, through reaction of the nitrogen oxides with hydrogen by contact with the nickel containing catalyst.

In a preferred embodiment of the invention, the non-catalytic partial oxidation of ammonia is performed in a burner by burning the ammonia in gaseous form with under-stoichiometric amounts of oxygen.

In another preferred embodiment, the non-catalytic partial oxidation step and the cracking step are performed in a single reactor vessel. Thereby, the reaction heat from the exothermic partial oxidation is optimally preserved for carrying out the endothermic ammonia cracking reaction.

Figure 2:
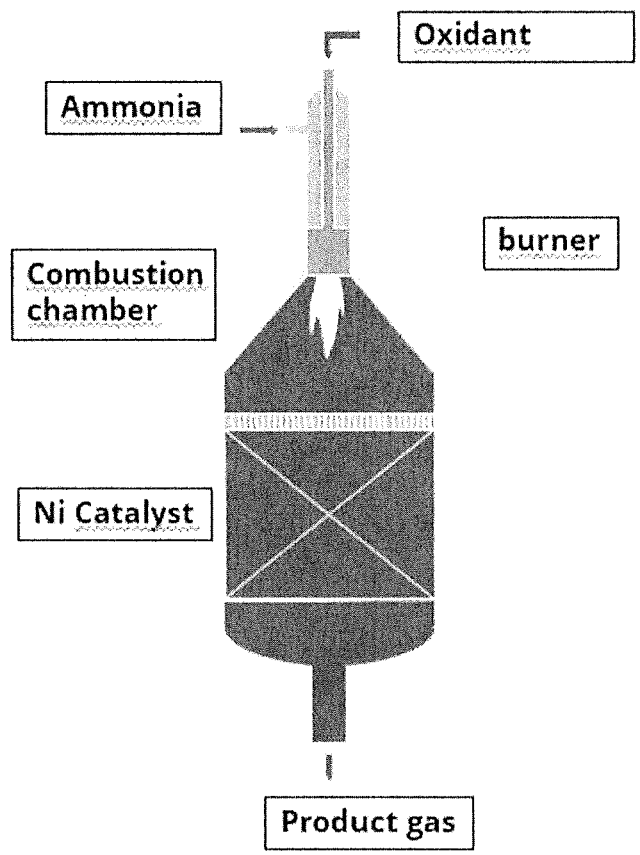

The single reactor vessel is preferably configured as an autothermal cracking reactor with a burner at inlet side of the reactor vessel and a catalyst bed downstream of the burner, similar to the known autothermal reforming reactors illustrated in FIG. 2.

The equilibrium temperature after contact with the nickel containing catalyst can be adjusted by varying the oxygen to ammonia feed flow rate into the non-catalytic partial oxidation step. This is equivalent to varying the lambda-value which is the ratio between the actual oxygen feed flow and that required for full stoichiometric combustion of the ammonia feed into nitrogen and water. For a fixed ammonia flow rate, the equilibrium temperature can be increased by either increasing the oxygen concentration in the oxygen containing gas and/or by increasing the flow rate of the oxygen containing gas.

Preferably, the oxygen to ammonia feed flow rate to the non-catalytic partial oxidation step is adjusted to result in an equilibrium temperature of the product gas between 700 and 1100° C. measured after contact with the nickel containing catalyst.

Thus, in an embodiment of the invention, the content of oxygen in the oxygen containing gas is varied corresponding to lambda-values between $\lambda=0.18$ and $\lambda=0.30$, resulting in equilibrium temperatures of $T_{eq}=700\text{-}1100°$ C.

Preferably, the oxygen containing gas employed in the non-catalytic partial oxidation step contains between 10 and 100 vol % oxygen.

Thus suitable sources for the oxygen containing gas can range from flue gas to pure oxygen or mixtures thereof.

The resulting product gas mixture leaving the cracking step is composed of hydrogen, nitrogen and water with an amount of residual uncracked ammonia.

Thus, in an embodiment, the process according to the invention comprises the further step of separating uncracked ammonia further contained in the product gas.

Preferably, the separation step is performed by a water wash of the product gas. In such a separation step the main part of the water from the autothermal cracking reactor will exit the separation step together with the ammonia.

The amount of ammonia separated from the product gas in the ammonia separation step can be recovered in an ammonia recovery step, such as distillation, and the recovered ammonia is preferably recycled to the to the non-catalytic partial oxidation step in the process. Simultaneously, this ammonia recovery step will clean the process condensate.

Depending on the use of the final hydrogen/nitrogen product gas, the mole ratio of hydrogen to nitrogen in the product gas may be adjusted for the intended use.

Thus in a further embodiment of the invention, the process comprises a further step of adjusting the hydrogen to nitrogen mole ratio of the product gas in a product gas adjustment unit. This product gas adjustment step may comprise a membrane or Pressure Swing Adsorption unit (PSA).

A preferred embodiment of the invention further contains the possibility of adding a hydrogen source to the ammonia feed or directly to the burner in the cracker reactor. Adding hydrogen to the ammonia feed reduces the auto ignition temperature by up to 100° C. enabling auto ignition of the ammonia at lower preheat temperature and it increases flammability during normal operation. The hydrogen source is preferably product gas or product gas adjusted for ammonia content, water and/or hydrogen/nitrogen ratio. Hydrogen from various utility sources and other processes can also be used.

The oxygen containing gas, such as ambient air, for the cracking step may contain small amounts of $CO_2$. It is well known that $CO_2$ and ammonia reacts in aqueous solutions, which can lead to fouling and or corrosion in the ammonia recovery section. Furthermore, if no measures are taken, $CO_2$ may accumulate in the process. The preferred embodiment of the invention contains measures to either remove the $CO_2$ from the oxidant, for example by washing the oxidant with a NaOH solution, or to add a NaOH solution to the distillation column in the ammonia recovery section with the purpose of removing the $CO_2$ as $Na_2CO_3$ in the stripped condensate.

Another approach to avoid $CO_2$ accumulation in the process is to include a methanation reactor in between the autothermal ammonia cracker and the ammonia separation step. By this approach, $CO_2$ is converted into methane by utilization of hydrogen obtained from the upstream cracking reactor:

$$CO_2 + 4H_2 \leftrightharpoons CH_4 + 2H_2O$$

A nickel or noble metal containing catalyst can catalyze this reaction. The advantage is that methane does not react with ammonia in aqueous solution, meaning that $CO_2$ accumulation is avoided by $CO_2$ conversion in the methanation reactor and the produced methane will then leave the process with the product gas from the ammonia separation step instead of being carried with the condensate to the recovery section.

A particular embodiment of the process according to the invention is shown in the drawings, wherein FIG. 1, is a schematic diagram of the ammonia cracking process according to a particular embodiment of the invention including an autothermal ammonia cracking reactor, an ammonia separation step, product gas adjustment and ammonia recovery.

FIG. 2 shows the single reactor vessel of the present invention configured as an autothermal cracking reactor with a burner at the inlet side of the reactor vessel and a catalyst bed downstream of the burner.

EXAMPLE

Process gas flows and compositions for the ammonia cracking process corresponding to a lambda value of $\lambda=0.21$ and a resulting equilibrium temperature of the product gas of 800° C. after contact with the nickel containing catalyst in the autothermal ammonia cracking reactor are shown in Table 1 below. The stream numbers refer to FIG. 1.

TABLE 1

| | | | | Stream no. | | | | | |
|---|---|---|---|---|---|---|---|---|---|
| Description | | 1 Ammonia | 2 Air | 3 Reactor outlet | 4 Wash water | 5 Product gas | 6 Condensate | 7 Recycle ammonia | 8 Light gases | 9 Stripped condensate |
| Flow [Nm³/h] | | 263200 | 205100 | 688800 | 68880 | 602700 | 155000 | 2024 | 145 | 152900 |
| Composition [mole %] | $H_2$ | 0.00 | 0.00 | 45.01 | 0.00 | 51.44 | 0.03 | 0.12 | 26.99 | 0.00 |
| | $N_2$ | 0.00 | 76.59 | 41.89 | 0.00 | 47.88 | 0.02 | 0.10 | 15.27 | 0.00 |
| | $O_2$ | 0.00 | 20.60 | 0.00 | 0.00 | 0.00 | 0.00 | 0.00 | 0.00 | 0.00 |
| | $H_2O$ | 0.00 | 1.85 | 12.50 | 100.00 | 0.35 | 98.61 | 4.00 | 0.02 | 99.96 |
| | $NH_3$ | 100.00 | 0.00 | 0.31 | 0.00 | 0.02 | 1.31 | 95.78 | 57.48 | 0.00 |
| | Ar | 0.00 | 0.92 | 0.27 | 0.00 | 0.31 | 0.00 | 0.00 | 0.23 | 0.00 |
| | $CO_2$ | 0.00 | 0.03 | 0.01 | 0.00 | 0.00 | 0.04 | 0.00 | 0.00 | 0.04 |
| | $NO_x$ | 0.00 | 0.00 | 3.3E−13 | 0.00 | 3.8E−13 | 0.00 | 0.00 | 0.00 | 0.00 |

The invention claimed is:

1. Process for the production of a product gas containing nitrogen and hydrogen from ammonia, comprising the steps of:
   non-catalytic partial oxidation of ammonia with an oxygen containing gas to a process gas containing nitrogen, water, amounts of nitrogen oxides and residual amounts of ammonia;
   cracking of at least a part of the residual amounts of ammonia to hydrogen and nitrogen in the process gas by contact with a nickel containing catalyst and simultaneously reducing the amounts of nitrogen oxides to nitrogen and water by reaction with a part of the hydrogen formed during cracking of the process gas by contact of the process gas with the nickel containing catalyst; and
   withdrawing the hydrogen and nitrogen containing product gas.

2. The process of claim 1, wherein the amounts of nitrogen oxides generated in the non-catalytic partial oxidation step are reduced by more than 80%, and up to 100% as limited by thermodynamic equilibrium, through reaction of the nitrogen oxides with hydrogen by contact with the nickel containing catalyst.

3. The process of claim 1, wherein the non-catalytic partial oxidation of ammonia is performed by burning the ammonia in gaseous form in a burner with under-stoichiometric amounts of oxygen containing gas.

4. The process of claim 1, wherein the non-catalytic partial oxidation step and the cracking step are performed in a single reactor vessel.

5. The process of claim 4, wherein the single reactor is an autothermal cracking reactor.

6. The process of claim 1, wherein the oxygen to ammonia feed flow rate to the non-catalytic partial oxidation step is adjusted to result in an equilibrium temperature of the product gas between 700 and 1100° C. after contact with the nickel containing catalyst.

7. The process of claim 1, wherein the content of oxygen in the oxygen containing gas is varied corresponding to lambda-values between $\lambda=0.18$ and $\lambda=0.30$, where lambda is the ratio between the actual oxygen feed flow and that required for full stoichiometric combustion of the ammonia into nitrogen and water.

8. The process of claim 1, wherein the oxygen containing gas contains between 10 and 100 vol % oxygen.

9. The process of claim 1, comprising the further step of converting $CO_2$ to methane in a methanation reactor by hydrogen obtained from the ammonia cracking step.

10. The process of claim 1, comprising the further step of separating uncracked ammonia further contained in the product gas.

11. The process of claim 8, wherein the residual ammonia is separated from the product gas by a water wash.

12. The process of claim 10, wherein the separated ammonia is recovered in an ammonia recovery step and recycled to the non-catalytic partial oxidation step.

13. The process of claim 10, comprising addition of NaOH to the ammonia recovery step.

14. The process of claim 1, comprising the further step of adjusting the hydrogen to nitrogen mole ratio of the product gas in a product gas adjustment unit.

15. The process of claim 3, comprising addition of a hydrogen source to the ammonia feed or directly to the burner.

16. The process of claim 15, wherein the hydrogen source is the ammonia cracking product gas, or product gas adjusted for ammonia content and/or hydrogen to nitrogen ratio.

17. The process of claim 15, wherein the hydrogen source is a utility supply or coming from another process.

18. The process of claim 1, comprising a $CO_2$ removal wash of the oxygen containing gas.

* * * * *